(12) United States Patent
Chung

(10) Patent No.: US 7,068,000 B1
(45) Date of Patent: Jun. 27, 2006

(54) TORQUE CONTROL DEVICE FOR ELECTRICAL TOOLS

(75) Inventor: Fu-Hsiang Chung, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 0 days.

(21) Appl. No.: 11/196,949

(22) Filed: Aug. 4, 2005

(51) Int. Cl.
    *H02P 7/00* (2006.01)
(52) U.S. Cl. .................. 318/434; 323/349; 323/265
(58) Field of Classification Search ............ 318/434; 323/349, 265
    See application file for complete search history.

(56) References Cited

U.S. PATENT DOCUMENTS

| | | | |
|---|---|---|---|
| 4,185,701 A | * | 1/1980 | Boys ........................ 173/183 |
| 4,426,588 A | * | 1/1984 | Weilenmann ............... 307/124 |
| 4,935,643 A | * | 6/1990 | Reichle et al. .............. 307/131 |
| 6,479,958 B1 | * | 11/2002 | Thompson et al. ......... 318/430 |
| 6,954,048 B1 | * | 10/2005 | Cho .......................... 318/484 |
| 2004/0050181 A1 | * | 3/2004 | Shimizu et al. ........ 73/862.331 |

* cited by examiner

*Primary Examiner*—Rita Leykin
(74) *Attorney, Agent, or Firm*—Alan D. Kamrath; Nikolai & Mersereau, P.A.

(57) ABSTRACT

A torque control device for an electrical tool has a switching circuit, a voltage detecting circuit, a torque detecting circuit and a processor. The switching circuit connects between a motor of the electrical tool and a DC voltage source. The voltage detecting circuit detects voltage or current variation of the motor. The torque detecting circuit based on the detected voltage or current variation data outputs an actual torque value of the motor. The processor compares the actual torque value with a default value to determine whether actual torque is greater than the default. If so, the switching circuit is turned off by the processor to prevent the motor from being damaged.

12 Claims, 3 Drawing Sheets

TORQUE CONTROL DEVICE FOR ELECTRICAL TOOLS

BACKGROUND OF THE INVENTION

1. Field of the Invention

The present invention relates to a torque control device, and more particularly to a torque control device for electrical tools, where the control device can automatically interrupt a power supply of the electrical tools if a detected actual torque is greater than a default torque value.

2. Description of Related Art

Electrical tools commonly have an electrical motor to drive a tool head thus assisting an operator to easily accomplish operations such as screwing or drilling. Each kind of tool head can sustain a particular torque corresponding to a target object to be driven. Therefore, the torque generated by the electrical tools is required to be adjustable for accommodating different target objects. If the torque exceeds a tolerable range that the tool head can sustain, this tool head will be temporarily disengaged from the motor so as to avoid possible damage to the tool head and the motor.

The default torque setting can be accomplished by mechanically varying the compressing extent of a spring installed in the electrical tools. The tool head is driven by the motor as long as the torque is within the default value. However, using the spring to mechanically set the torque and obtaining a precise default value are both very difficult. Further, even when the tool head has been temporarily disengaged under the motor, the motor in the idling status continuously consumes power.

Therefore, the invention provides a torque control device for electrical tools to mitigate or obviate the aforementioned problem.

SUMMARY OF THE INVENTION

An objective of the present invention is to provide a torque control device for electrical tools, wherein a default torque can be precisely set. If the actual torque value of a motor of the electrical tools is greater than the default value, the power supply to the motor can be interrupted to protect the motor.

To accomplish the objective, the torque control device provides:

a switching circuit connected between the motor and the DC voltage source;

a processor with an output terminal connected to the switching circuit to turn on/off the switching circuit;

a voltage detecting circuit having an input terminal connected between the motor and the DC voltage source for detecting voltage variation data of the motor;

a torque detecting circuit connected between the voltage detecting circuit and the processor, wherein the torque detecting circuit produces a motor torque value based on the voltage variation data, wherein the motor torque value is output to the processor; and a torque setting unit connected to the processor, wherein a default torque is set in the processor by the torque setting unit.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
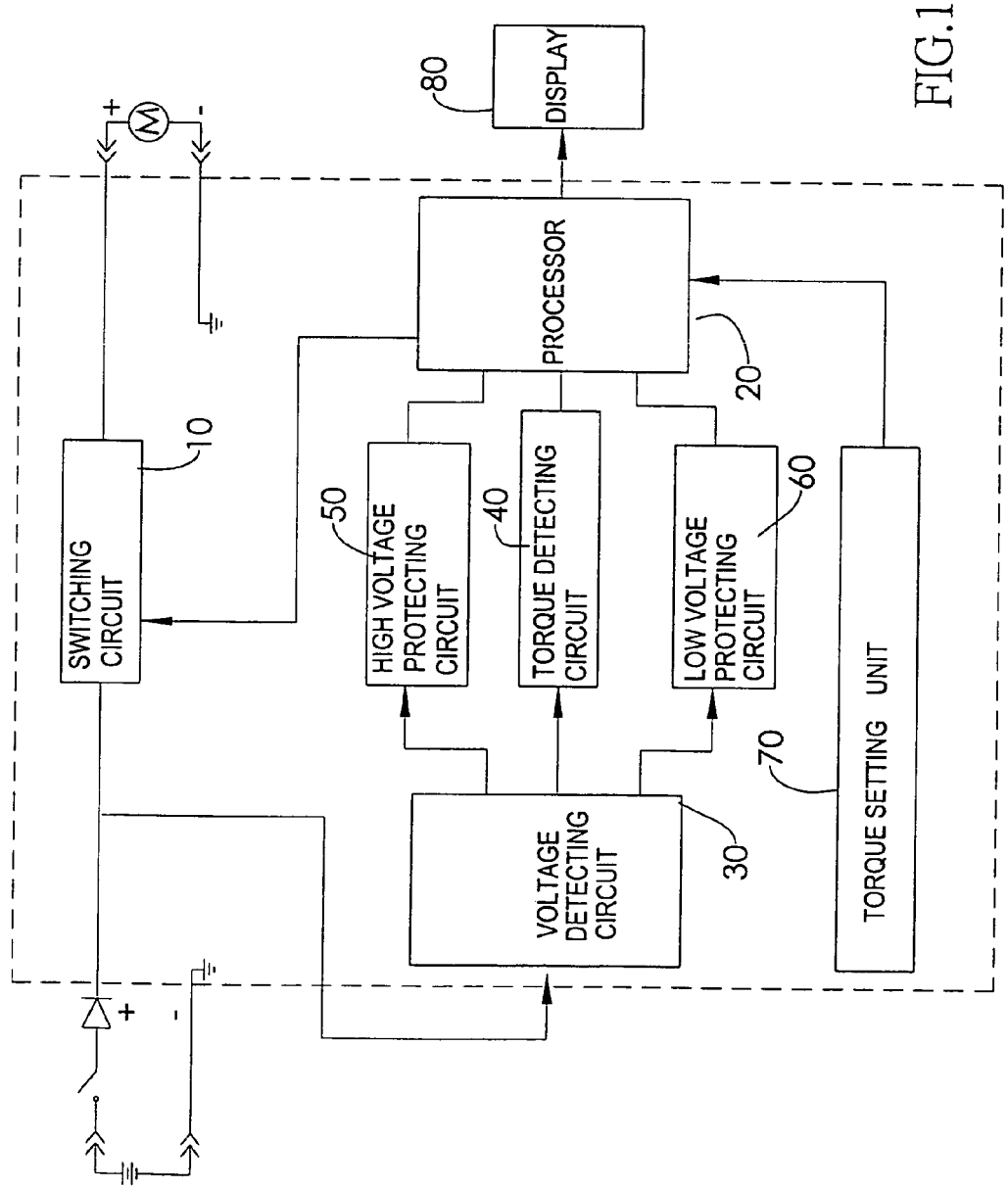
FIG. 1 is a block diagram of a torque control device in accordance with the present invention.

With reference to FIG. 1, a torque control device for electrical tools comprises a switching circuit (10), a processor (20), a voltage detecting circuit (30), a torque detecting circuit (40), a high voltage protecting circuit (50), a low voltage protecting circuit (60), a torque setting unit (70) and a display (80).

The switching circuit (10) is connected between a motor and a DC voltage source, wherein the DC voltage source can be a battery.

The processor (20) has a first output terminal connected to the switching circuit (10) so as to control its on/off statuses.

The voltage detecting circuit (30) has an input terminal connected between the DC voltage source and the motor, whereby voltage or current variations of the motor can be detected.

The torque detecting circuit (40) is connected between the voltage detecting circuit (30) and the processor (20). Based on voltage and/or current variation data of the motor or their varying frequency within a time unit, the torque detecting circuit (40) can based on the detected data to generate a torque value of the motor and supplies the torque value to the processor (20).

The high voltage protecting circuit (50) connects between the voltage detecting circuit (30) and the processor (20). The high voltage protecting circuit (50) compares the detected voltage value from the voltage detecting circuit (30) with a high reference voltage. If the detected voltage is greater than the high reference voltage, the high voltage protecting circuit (50) outputs a signal to the processor (20) so that the switching circuit (10) can be turned off upon reception of the command of the processor.

The low voltage protecting circuit (60) is connected between the voltage detecting circuit (30) and the processor (20). The low voltage protecting circuit (60) compares the detected voltage value from the voltage detecting circuit (30) with a low reference voltage. If the detected voltage is smaller than the low reference voltage, the low voltage protecting circuit (50) outputs a signal to the processor (20) so that the switching circuit (10) can be turned off upon reception of the command output from the processor (20).

The torque setting unit (70) is connected to the processor (20). An operator can set a default torque in the processor (20) through the torque setting unit (70).

The display (80) is connected to an output terminal of the processor (20) for displaying the default torque level set by the operator.

Figure 2:
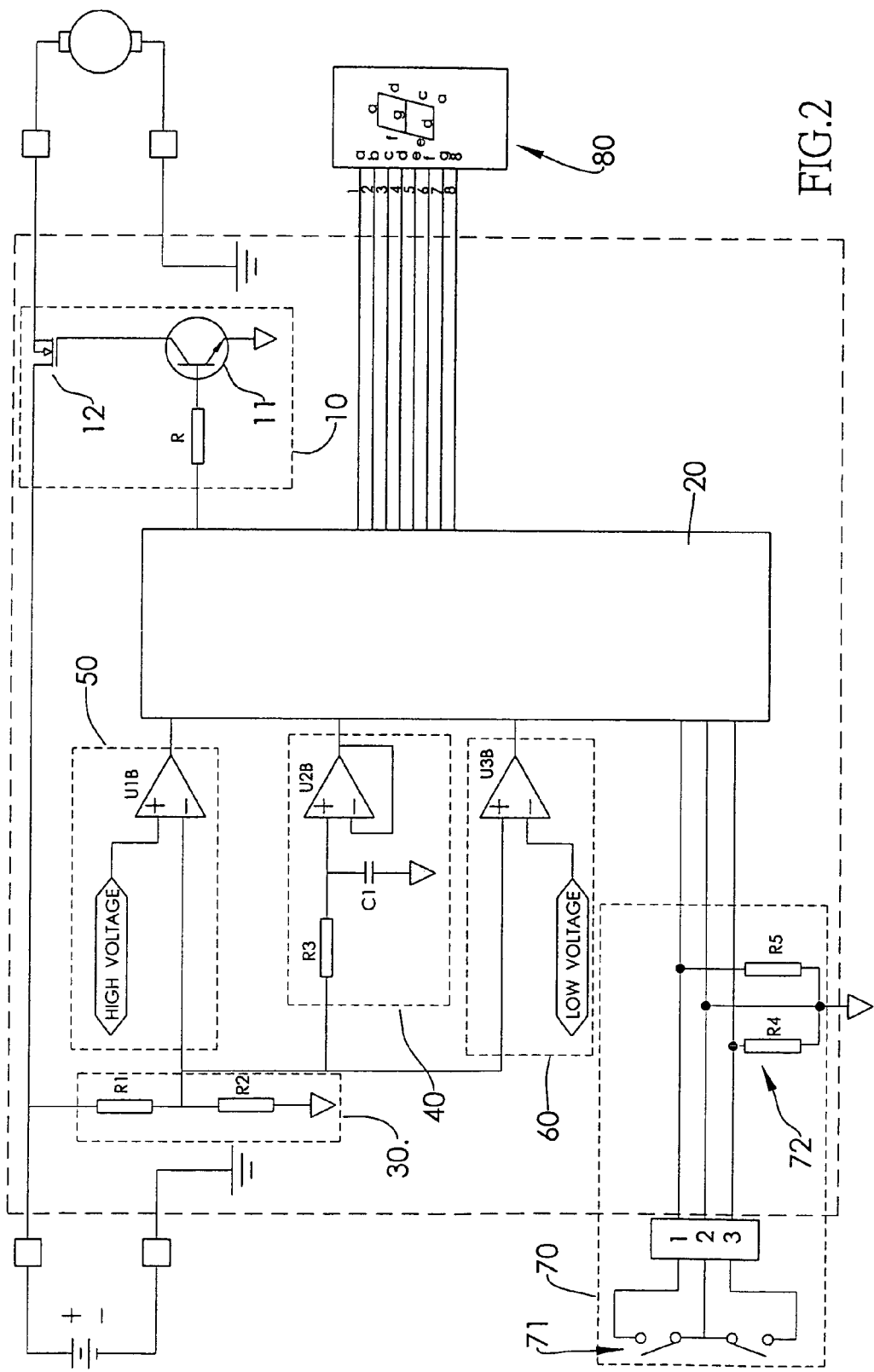
FIG. 2 is a circuit diagram of the torque control device according to a first embodiment of the present invention.

With reference to FIG. 2, the switching circuit (10) comprises a driving transistor (11) and a switching transistor (12). The driving transistor (11) comprises a bipolar junction transistor (BJT) with a base, a collector and an emitter. The switching transistor (12) is a MOSFET with a gate, a source and a drain. The driving transistor (11) provides its base connecting to the processor (20) through a resistor, and its collector is connected to the gate of the switching transistor (12). The drain and source of the switching transistor (12)

are respectively connected to the DC voltage source and the motor. When the processor (20) output a signal with a high voltage level to activate the driving transistor (11), the switching transistor (12) is subsequently turned on which allows the DC voltage source provides power to the motor. Otherwise, when the driving transistor (11) is deactivated, the switching transistor (12) is accordingly turned off, whereby the power supply to the motor can be terminated.

The voltage detecting circuit (30) is composed of a voltage dividing circuit with two resistors R1, R2 connected in series. One terminal of the resistor R1 is connected to the DC voltage source and the switching circuit (10). The other terminal of the resistor R1 to which the resistor R2 is connected is coupled to the high voltage protecting circuit (50).

The torque detecting circuit (40) comprises an operation amplifier U2B and an RC circuit formed by a resistor R3 and a capacitor C1. The operation amplifier is configured as a buffer, wherein the negative terminal and the output terminal of the operation amplifier are connected together to form a negative feedback loop.

The high voltage protecting circuit (50) is formed by an operation amplifier U1B that serves as a comparator. The comparator has a positive input terminal and a negative input terminal which are respectively coupled to the high reference voltage and the voltage detecting circuit (30). If the output voltage of the voltage detecting circuit (30) is greater than the high reference voltage, the comparator outputs a signal with a low level to notify the processor (20). The processor (20) can subsequently turn off the switching circuit (10) to avoid possible damage.

The low voltage protecting circuit (60) is also formed by an operation amplifier U3B serving as a comparator. The comparator has a positive input terminal and a negative input terminal which are respectively coupled to the voltage detecting circuit (30) and a low reference voltage. If the output voltage of the voltage detecting circuit (30) is smaller than the low reference voltage, the comparator outputs a signal with a low level to notify the processor (20). The processor (20) can subsequently turn off the switching circuit (10).

The torque setting unit (70) comprises a switch (71) having multiple nodes and a torque setting circuit (72). The torque setting circuit (72) is formed by multiple resistors. When one node in the switch (71) is selected, a respective input terminal of the processor (20) corresponding to the node represents a voltage. The processor (20) according to the represented voltage determines the torque value.

The display (80) is preferably a seven-segment display element with multiple input terminals connected to the processor (20).

Figure 3:
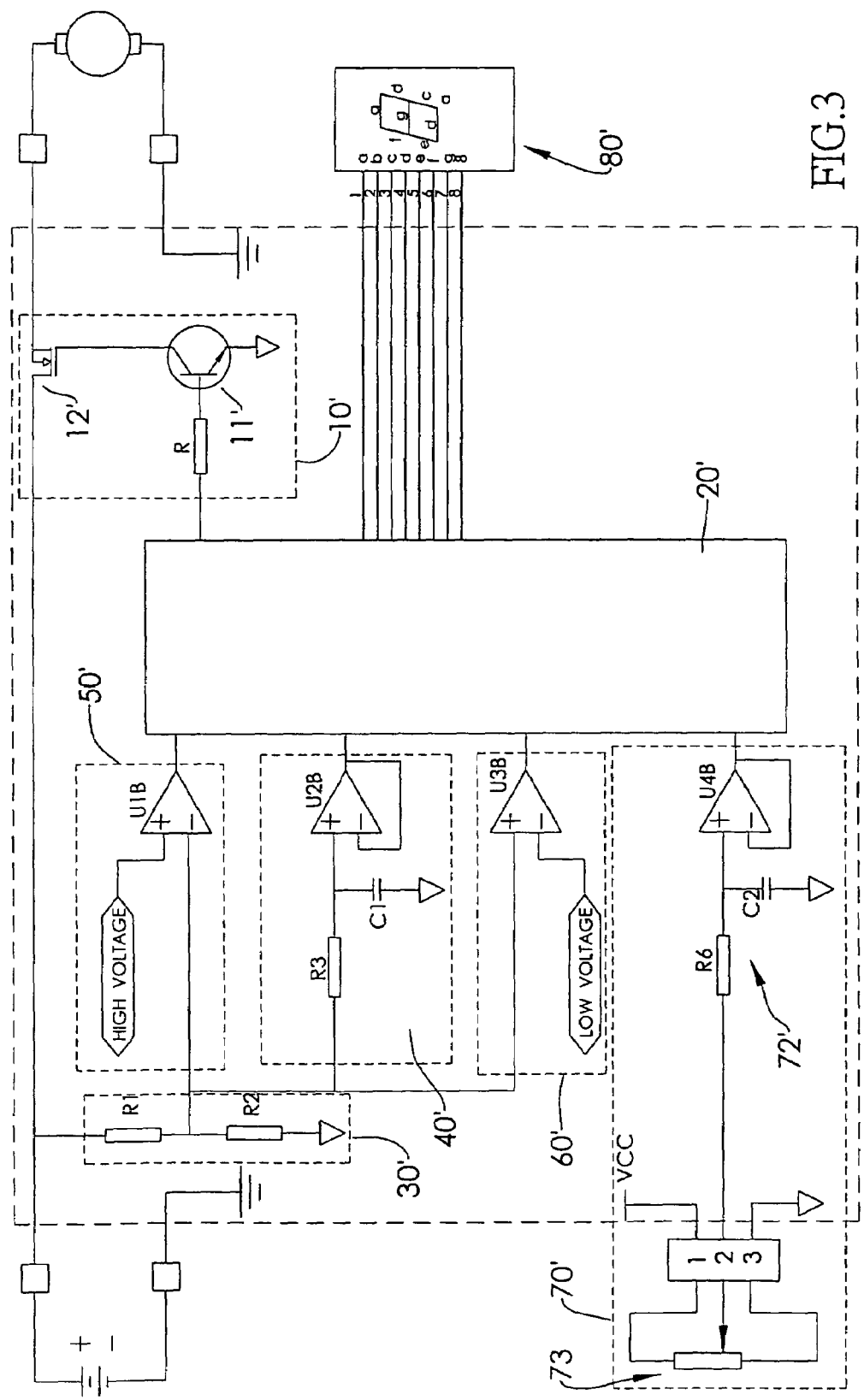
FIG. 3 is a circuit diagram of the torque control device according to a second embodiment of the present invention.

With reference to FIG. 3, the second embodiment is substantially similar to the first one of FIG. 2. The modification in this embodiment aims at the torque setting unit (70'). The torque setting unit (70') includes a rheostat (73) and a torque setting circuit (72'), wherein the torque setting circuit (72') consists of a resistor R6, a capacitor C2 and an operation amplifier U4B. The operation amplifier U4B is configured to form a buffer.

The voltage detecting circuit accompanying the torque detecting circuit can acquire the instant torque value of a motor according to the voltage and/or current variation data between the motor and the DC voltage source, or the varying frequency of the voltage and/or current in a time unit. The processor further compares the torque value with a default torque to determine whether the motor should be turned off. If the torque value of the motor is greater than the default value, the power supply to the motor is interrupted. Thus, the default value can be precisely set by a torque setting unit.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A torque control device for an electrical tool having a motor powered by a DC voltage source, the torque control device comprising:
   a switching circuit being connected between the motor and the DC voltage source;
   a processor with an output terminal being connected to the switching circuit to turn on or turn off the switching circuit;
   a voltage detecting circuit having an input terminal being connected between the motor and the DC voltage source to detect voltage variation data of the motor;
   a torque detecting circuit being connected between the voltage detecting circuit and the processor to produce a motor torque value to be output to the processor based on the voltage variation data;
   a torque setting unit being connected to the processor to provide a default torque value to the processor;
   a high voltage protecting circuit being connected between the voltage detecting circuit and the processor and comprising an operating amplifier having
      two input terminals being connected respectively to the voltage detecting circuit and a high reference voltage; and
      an output terminal being connected to the processor;
   a low voltage protecting circuit being connected between the voltage detecting circuit and the processor and comprising an operating amplifier having
      two input terminals being connected respectively to the voltage detecting circuit and a low reference voltage; and
      an output terminal being connected to the processor; and
   a display being connected to the processor to show the default torque.

2. The torque control device as claimed in claim 1, wherein the switching circuit comprises:
   a driving transistor having a base connected to the processor through a resistor a collector and an emitter; and
   a switching transistor having a gate connected to the collector, a source and a drain with the source and drain connected respectively to the motor and the DC voltage source;
   the voltage detecting circuit comprises a voltage dividing circuit formed by a first resistor and a second resistors connected in series; wherein a first terminal of the first resistor is connected to the DC voltage source and the switching circuit, and a second terminal of the first resistor R1 connecting the second resistor is coupled to the high voltage protecting circuit; and
   the torque detecting unit comprises a first RC circuit and an operating amplifier as a buffer.

3. The torque control device as claimed in claim 2, the torque setting unit comprising:
   a switch having multiple nodes; and a torque setting circuit formed by multiple resistors, wherein each resistor is connected to a respective node of the switch and a respective input terminal of the processor.

4. The torque control device as claimed in claim 2, the torque setting unit comprising:
   a rheostat; and
   a torque setting circuit formed by an RC circuit and a operating amplifier, wherein the operation amplifier has an input terminal connected to the RC circuit and has an output terminal connected to the processor.

5. The torque control device as claimed in claim 1, the torque setting unit comprising:
   a switch having multiple nodes; and
   a torque setting circuit formed by multiple resistors, wherein each resistor is connected to a respective node of the switch and a respective input terminal of the processor.

6. The torque control device as claimed in claim 1, the torque setting unit comprising:
   a rheostat; and
   a torque setting circuit formed by an RC circuit and an operating amplifier, wherein the operating amplifier has an input terminal connected to the RC circuit and has an output terminal connected to the processor.

7. A torque control device for an electrical tool having a motor powered by a DC voltage source, the torque control device comprising:
   a processor;
   a switching circuit being connected between the motor and the DC voltage source and comprising
      a driving transistor having a base connected to the processor through a resistor, a collector and an emitter; and
      a switching transistor having a gate connected to the collector, and a source and a drain connected respectively to the motor and the DC voltage source;
   the processor with an output terminal being connected to the switching circuit to turn on or turn off the switching circuit;
   a high voltage protecting circuit being connected between the voltage detecting circuit and the processor;
   a voltage detecting circuit having a voltage dividing circuit formed by a first resistor and a second resistor connected in series, wherein
      a first terminal of the first resistor is connected to the DC voltage source and the switching circuit; and
      a second terminal of the first resistor connecting to the second resistor is connected to the high voltage protecting circuit;
   a torque detecting circuit being connected between the voltage detecting circuit and the processor to produce a motor torque value to be output to the processor based on the voltage variation data; and a torque setting unit being connected to the processor to provide a default torque value to the processor and comprising a first RC circuit and a first operating amplifier as a buffer.

8. The torque control device as claimed in claim 7, the high voltage protecting circuit comprising:
   a second operating amplifier having
      two input terminals connected respectively to the voltage detecting circuit and a high reference voltage; and
      an output terminal connected to the processor;
   with the torque control device further comprising:
   a low voltage protecting circuit being connected between the voltage detecting circuit and the processor and comprising:
      a third operating amplifier having two input terminals connected respectively to the voltage detecting circuit and a low reference voltage; and
      an output terminal connected to the processor; and
   a display connected to the processor to show the default torque.

9. The torque control device as claimed in claim 8, the torque setting unit comprising:
   a switch having multiple nodes; and
   a torque setting circuit being formed by multiple resistors, wherein each resistor is connected to a respective node of the switch and a respective input terminal of the processor.

10. The torque control device as claimed in claim 8, the torque setting unit comprising:
    a rheostat; and
    a torque setting circuit being formed by an RC circuit and a fourth operating amplifier, wherein the operating amplifier has
    an input terminal connected to the RC circuit; and
    an output terminal connected to the processor.

11. The torque control device as claimed in claim 7, the torque setting unit comprising:
    a switch having multiple nodes; and
    a torque setting circuit being formed by multiple resistors, wherein each resistor is connected to a respective node of the switch and a respective input terminal of the processor.

12. The torque control device as claimed in claim 7, the torque setting unit comprising:
    a rheostat; and
    a torque setting circuit being formed by an RC circuit and a fourth operating amplifier, wherein the operating amplifier has
    an input terminal connected to the RC circuit; and
    an output terminal connected to the processor.

* * * * *